Dec. 1, 1925.
R. KAUCH
RANGE FINDER
Filed Dec. 14, 1922
1,563,373
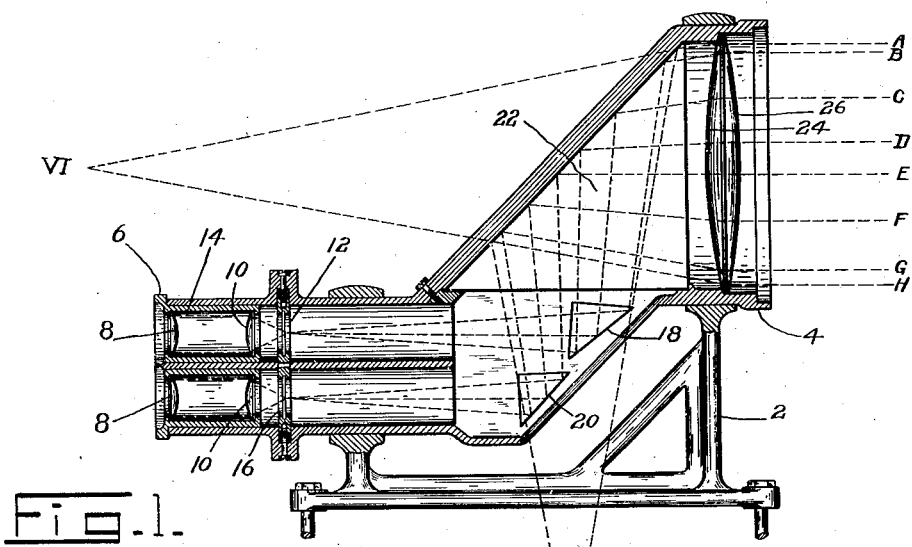
Fig. 1.
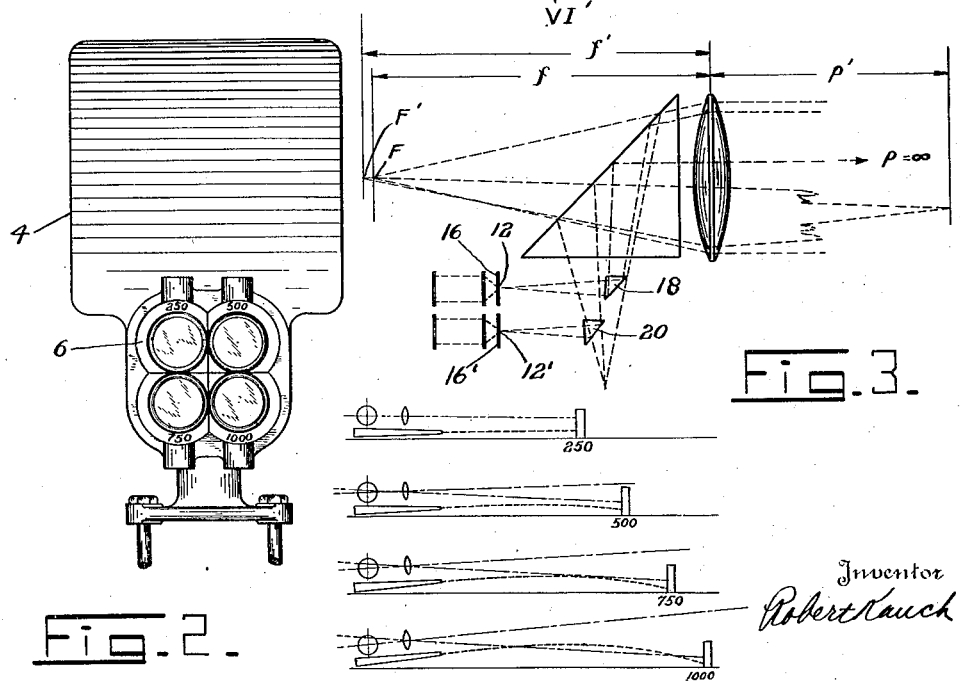
Fig. 2.
Fig. 3.
Fig. 4.
Inventor
Robert Kauch
Robert A. Young Attorney Patented Dec. 1, 1925.

1,563,373

UNITED STATES PATENT OFFICE.

ROBERT KAUCH, OF DAYTON, OHIO.

RANGE FINDER.

Application filed December 14, 1922. Serial No. 607,004.

*To all whom it may concern:*

Be it known that I, ROBERT KAUCH, a citizen of the United States, residing at Dayton, in the county of Montgomery and State of Ohio, have invented certain new and useful Improvements in Range Finders, of which the following is a specification.

My invention pertains to range finders and more particularly to range finders that are to be used in connection with airplanes or the like.

Heretofore, a non-adjustable or fixed range sight has been found wholly impractical for airplane work as it would be necessary to wait for an enemy or the objective to come into range by relative movement before the correct ranges could be obtained. Again adjustable range sights require adjustments for the correct range which consume time and such time lost may be costly.

It is therefore one object of my invention to provide a fixed range sight or rather, a combination of fixed range sights that will not be open to either of the objections above noted.

It is a further object of my invention to provide a composite sight that will be accurate but simple of construction and operation.

Further objects will become apparent from the description, from the claims and from the drawing, in which:—

Fig. 1 is a longitudinal elevation of one embodiment of my invention, parts shown in section;

Fig. 2 is an elevation view of the rear or observing end;

Fig. 3 is a diagrammatic layout of the light paths and;

Fig. 4 is a diagrammatic showing of the device and the principle upon which it is based.

Referring to Figs. 1 and 2 which show, as noted supra, one physical embodiment of my invention, 2 is a standard or base upon which is mounted the range finder and by which the finder is secured to the gun in any suitable manner. A housing 4 is composed of brass or other weather resisting material and may comprise a plurality of parts for convenience of manufacture and assembly. A compound eye or observing end 6 is suitably mounted in the housing 4 as shown and contains two plano-convex lenses 8, 10 mounted to bring them two thirds ($\frac{2}{3}$) of their focal length apart which focuses the combination one fourth ($\frac{1}{4}$) the focal length of one of the lenses in front of the front face of the lens 10 at a point 12. This combination forms the standard Huygens eye-piece used on certain makes of telescopes so it will not be more fully described. A plurality of these lens combinations are mounted as shown in tubular portions 14 of the member 6 and they are snugly fitted in the housing, and at the points 12 are placed reticle glasses 16 which may be constructed of thin pieces of clear glass having hair lines engraved thereon and are arranged in the housing 4, so as to permit initial adjustment of the range finder and by vertical movement thereof to compensate for any desired trajectory. A plurality of prisms 18, 20 are arranged in certain definite relation (one for each eyepiece) to the various lenses 8, 10 to a master prism 22, and to a positive lens element which may comprise sub-elements 24, 26 arranged to form an achromatic master lens for the instrument.

In theory, light from a source at an infinite distance will fall on the master lens in parallel rays, A, B, C, etc., where they are bent into the prism 22, to be again bent into the prisms 18, 20 and thence through the reticle glasses 16, through the lenses 8, 10 and to the observer's eye. From the source a real image will be formed at VI in the absence of prism 22, and upon refraction a second real image will be formed at VI' in the absence of prisms 18, 20 which bend the light rays to a focus upon the reticle.

Referring to Fig. 3, it will be understood that for the convergent lens (24, 26), a source of light at an infinite distance $p$ would be focused at F, the principal focus of the lens, whereas if the light be from a source at a finite distance $p'$ it would be focused at a distance F', assuming no prisms in the light path. The light rays from different distances, focusing at different points, will strike the master prism 22 at different angles, and will follow converging paths through the several auxiliary prisms 18, 20 to be there deflected in their respective paths of refraction to the eye of the observer. If reticle 16 is to apply to the objective at an infinite distance, then the distance from reticle 16 to prism 18 through the master prism to the center of the master lens must be equal to $f$; similarly the distance from reticle 16' to prism 20 through the master prism to the center of the master lens must be equal to $f'$, if this reticle is to apply to the objective at a finite distance $p'$. It is this condition precedent that makes it possible to focus the master lens upon the several reticle glasses for different object distances. It will be apparent from the optics of image formation that there will be considerable difference between the foci, for ranges 250, 500, 750 and 1000 yards.

In order to clearly understand the application of the principles involved, reference may be had to Fig. 4, in which I have shown diagrammatically each of the sights, in connection with the gun, as a single unit. For 250 yards, the line of sight will be, for all intents and purposes, parallel and coincident with the axis of the gun barrel. Since for each increment of increase in range, for example, of 250 yards, it will be necessary to elevate the gun, the reticles will be shifted vertically as an initial adjustment to compensate for various trajectories. Thus when the objective falls on the cross lines (reticle) in the eye-piece in focus for that range, the gun will have been elevated the proper amount. Thus it will be apparent that the relation of the line of sight to the trajectory of the bullet for the several ranges will be as shown in Fig. 4.

The observer by a simple shift of his eye can command a view of an objective through all the eye-pieces and may instantaneously determine in which of the eye-pieces the objective appears clearest. It will then be necessary to merely elevate, depress or traverse the gun to bring the objective or a vulnerable part thereof on the intersection of the cross lines of the reticle.

I may adjust the reticle glasses horizontally to compensate for wind velocity etc., and I may use a rotatable set of eye-pieces, but I consider a stationary set (as herein described) for immediate comparison the most advantageous. In case I use a rotatable set of eye-pieces, a series of lenses of different focal lengths will be used in the eye-pieces.

I claim—

1. In an optical system, an objective lens, a prism to deflect the rays of light passing through said objective lens through ninety degrees, and a series of prisms placed between said first mentioned prism and the focus of said objective lens in such manner that the images of objects at predetermined distances are all focused in the same plane.

2. In an optical system, an objective lens, a prism to deflect the rays of light passing through said objective lens through ninety degrees, and a series of prisms placed between said first mentioned prism and the focus of said objective lens in such manner that the images of objects at predetermined distances are all focused in different parts of the same plane.

3. In an optical system, an objective lens, a prism to deflect the rays of light passing through said objective lens through ninety degrees, a series of prisms placed between said first mentioned prism and the focus of said objective lens in such manner that the images of objects at predetermined distances are all focused in different parts of the same plane, and a series of eye-pieces, one for each image of the objects at said predetermined distances.

4. An optical instrument comprising a housing, an objective lens positioned at one extremity of said housing, a series of eye-pieces positioned at the other extremity of said housing, and means placed between said objective lens and said eyepieces, so that images of objects at predetermined distances will appear in the focus of certain eyepieces of said series.

5. An optical instrument comprising a housing, an objective lens positioned at one extremity of said housing, a series of eye-pieces positioned at the other extremity of said housing, a series of reticules positioned in the focal plane of said objective lens, one of said reticules being provided for each of the eye-pieces, and means placed between said objective lens and said eye-pieces, so that images of objects at predetermined distances will appear in the plane of certain reticules of said series.

In testimony whereof I affix my signature.

ROBERT KAUCH.